(12) United States Patent
Nakagawara

(10) Patent No.: US 8,810,716 B2
(45) Date of Patent: Aug. 19, 2014

(54) IMAGING APPARATUS AND CAMERA SYSTEM

(75) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 13/439,712

(22) Filed: Apr. 4, 2012

(65) Prior Publication Data

US 2012/0257102 A1    Oct. 11, 2012

(30) Foreign Application Priority Data

Apr. 11, 2011    (JP) .................................. 2011-087631

(51) Int. Cl.
*H04N 5/222*    (2006.01)
*G03B 15/00*    (2006.01)

(52) U.S. Cl.
USPC ............ 348/370; 348/371; 396/164; 396/157

(58) Field of Classification Search
USPC ........... 348/371, 370; 396/173, 171, 157, 164
See application file for complete search history.

(56) References Cited

U.S. PATENT DOCUMENTS

| 7,539,403 | B2* | 5/2009 | Endo | 396/52 |
| 7,764,880 | B2* | 7/2010 | Hamada | 396/157 |
| 2004/0170420 | A1* | 9/2004 | Fukui | 396/157 |
| 2009/0231468 | A1* | 9/2009 | Yasuda | 348/234 |
| 2010/0020200 | A1* | 1/2010 | Fujiwara | 348/234 |
| 2010/0079644 | A1* | 4/2010 | Tamura | 348/302 |
| 2010/0149380 | A1* | 6/2010 | Chou et al. | 348/234 |

FOREIGN PATENT DOCUMENTS

JP    2005-275265 A    10/2005

* cited by examiner

*Primary Examiner* — Sinh Tran
*Assistant Examiner* — Shahbaz Nazrul
(74) *Attorney, Agent, or Firm* — Canon U.S.A., Inc., IP Division

(57) ABSTRACT

An imaging apparatus capable of performing photographing in which a light emitting unit executes main light emission includes a photometric unit that executes photometry, a selection unit that selects a certain area in a photographing screen, and a control unit that determines a main light emission amount of the light emitting unit based on a photometric value acquired by photometry executed by the photometric unit when the light emitting unit executes pre-flash emission and controls, based on a position of the area selected by the selection unit, a light receiving amount of the photometric unit during a photometry period for acquiring the photometric value used for determining the main light emission amount.

13 Claims, 5 Drawing Sheets

LIGHT AMOUNT DROP LEVEL
FROM CENTER IN EACH AF FRAME

| 2.7 | 1 | 0.1 | 1 | 2.7 |
|---|---|---|---|---|
| 2.9 | 1.1 | 0 | 1.1 | 2.9 |
| 3.8 | 2.1 | 2.1 | 2.1 | 3.8 |

PRE-FLASH AMOUNT CORRECTION
TABLE IN EACH AF FRAME

| 3 | 1 | 0 | 1 | 3 |
|---|---|---|---|---|
| 3 | 1 | 0 | 1 | 3 |
| 4 | 2 | 2 | 2 | 4 |

FIG.5A

ARRANGEMENT EXAMPLE OF AF FRAMES

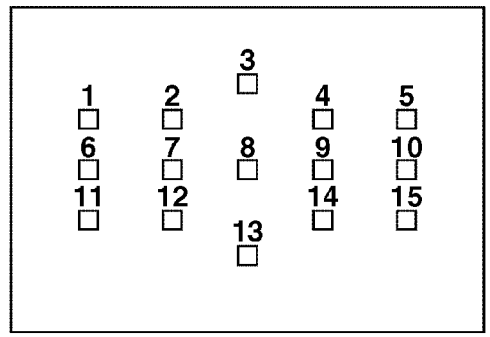

FIG.5B

DECREASE IN ILLUMINATION LEVEL TABLE BY PHOTOMETRIC OPTICAL SYSTEM WHEN STANDARD FOCUSING PLATE IS USED

| AF FRAME NO. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LENS | A | 2.2 | 1.1 | 1 | 1.1 | 2.2 | 2 | 1 | 0 | 1 | 2 | 2.2 | 1.1 | 1 | 1.1 | 2.2 |
| | B | 2.7 | 1 | 0.1 | 1 | 2.7 | 2.9 | 1.1 | 0 | 1.1 | 2.9 | 3.8 | 2.1 | 2.1 | 2.1 | 3.8 |
| | C | 2 | 0 | 0 | 0 | 2 | 2 | 0 | 0 | 0 | 2 | 3 | 1 | 1 | 1 | 3 |

FIG.5C

PRE-FLASH AMOUNT CORRECTION TABLE WHEN STANDARD FOCUSING PLATE IS USED

| AF FRAME NO. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LENS | A | 2 | 1 | 1 | 1 | 2 | 2 | 1 | 0 | 1 | 2 | 2 | 1 | 1 | 1 | 2 |
| | B | 3 | 1 | 0 | 1 | 3 | 3 | 1 | 0 | 1 | 3 | 4 | 2 | 2 | 2 | 4 |
| | C | 2 | 0 | 0 | 0 | 2 | 2 | 0 | 0 | 0 | 2 | 3 | 1 | 1 | 1 | 3 |

FIG.5D

DECREASE IN ILLUMINATION LEVEL TABLE BY PHOTOMETRIC OPTICAL SYSTEM WHEN INTERCHANGEABLE FOCUSING PLATE A IS USED

| AF FRAME NO. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LENS | A | 2.1 | 1.1 | 1.1 | 1.1 | 2.1 | 2.1 | 1.1 | 0 | 1.1 | 2.1 | 2.1 | 1.1 | 1.1 | 1.1 | 2.1 |
| | B | 3.1 | 1 | 0 | 1 | 3.1 | 3.3 | 1 | 0 | 1 | 3.3 | 4.7 | 2.6 | 2.5 | 2.6 | 4.7 |
| | C | 2.2 | 0 | 0 | 0 | 2.2 | 2 | 0 | 0 | 0 | 2 | 3.1 | 1.1 | 1 | 1.1 | 3.1 |

FIG.5E

PRE-FLASH AMOUNT CORRECTION TABLE WHEN INTERCHANGEABLE FOCUSING PLATE A IS USED

| AF FRAME NO. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LENS | A | 2 | 1 | 1 | 1 | 2 | 2 | 1 | 0 | 1 | 2 | 2 | 1 | 1 | 1 | 2 |
| | B | 3 | 1 | 0 | 1 | 3 | 3 | 1 | 0 | 1 | 3 | 5 | 3 | 3 | 3 | 5 |
| | C | 2 | 0 | 0 | 0 | 2 | 2 | 0 | 0 | 0 | 2 | 3 | 1 | 1 | 1 | 3 |

# IMAGING APPARATUS AND CAMERA SYSTEM

BACKGROUND OF THE INVENTION

1. Field of the Invention

The present invention relates to an imaging apparatus and a camera system that can perform photographing while causing a light emitting apparatus to emit light.

2. Description of the Related Art

To capture a still image by causing a light emitting apparatus such as a flash apparatus to emit light, conventional imaging apparatus and camera systems perform preliminary light emission (hereinafter, "pre-flash") to measure object conditions such as exposure in advance before main light emission for real photographing (hereinafter, "main-flash").

For example, Japanese Patent Application Laid-Open No. 2005-275265 discusses an imaging apparatus which acquires a photometric value when pre-flash is not executed and a photometric value when pre-flash is executed by a photometric sensor having a plurality of photometric areas, and performs weight calculation for a photometric value of each photometric area based on a ratio of the acquired photometric values to calculate a photometric value of the main light emission.

However, when a main light emission amount is calculated based on a photometric result at the time of pre-flash, the influence of a drop in peripheral illumination by a photometric optical system, which occurs due to a position of a lens, a focusing lens, or the photometric sensor, must be taken into account.

When a log sensor having a wide dynamic range is used for the photometric sensor, there is a high possibility that even when a drop in peripheral illumination occurs, a photometric value of a surrounding part will be within the dynamic range.

However, when a linear sensor such as a charge-coupled device (CCD) having a narrow dynamic range is used, the influence of a drop in peripheral illumination is larger than that of the photometric sensor having a wide dynamic range. For example, when a linear sensor of ten dynamic range levels is used, if a light amount drops by six levels while ten levels at the center, a dynamic range of only four levels can be acquired at the surrounding part. The degree of a light amount drop is represented by the number of levels, which corresponds to Additive system of Photographic Exposure (APEX) values.

As a result, when a main object is present in an area where a drop in peripheral illumination is occurred, if pre-flash is executed based on a light emission amount set with a center as a reference, a photometric value of the main object may too small to be within a dynamic range, disabling acquisition of an accurate photometric value of the main object. In such a case, calculation of an appropriate main light emission amount is difficult for the main object.

SUMMARY OF THE INVENTION

According to an aspect of the present invention, an imaging apparatus configured to perform photographing with a light emitting unit executing main light emission includes a photometric unit configured to execute photometry, a selection unit configured to select a certain area in a photographing screen, and a control unit configured to determine a main light emission amount of the light emitting unit based on a photometric value acquired by photometry executed by the photometric unit when the light emitting unit executes pre-flash and, based on a position of the area selected by the selection unit, control a light receiving amount of the photometric unit during a photometry period for acquiring the photometric value used for determining the main light emission amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, 5C, 5D, and 5E illustrate examples of pre-flash amount correction tables to determine a correction amount of a pre-flash amount.

DESCRIPTION OF THE EMBODIMENTS

Various exemplary embodiments, features, and aspects of the invention will be described in detail below with reference to the drawings.

Figure 1:
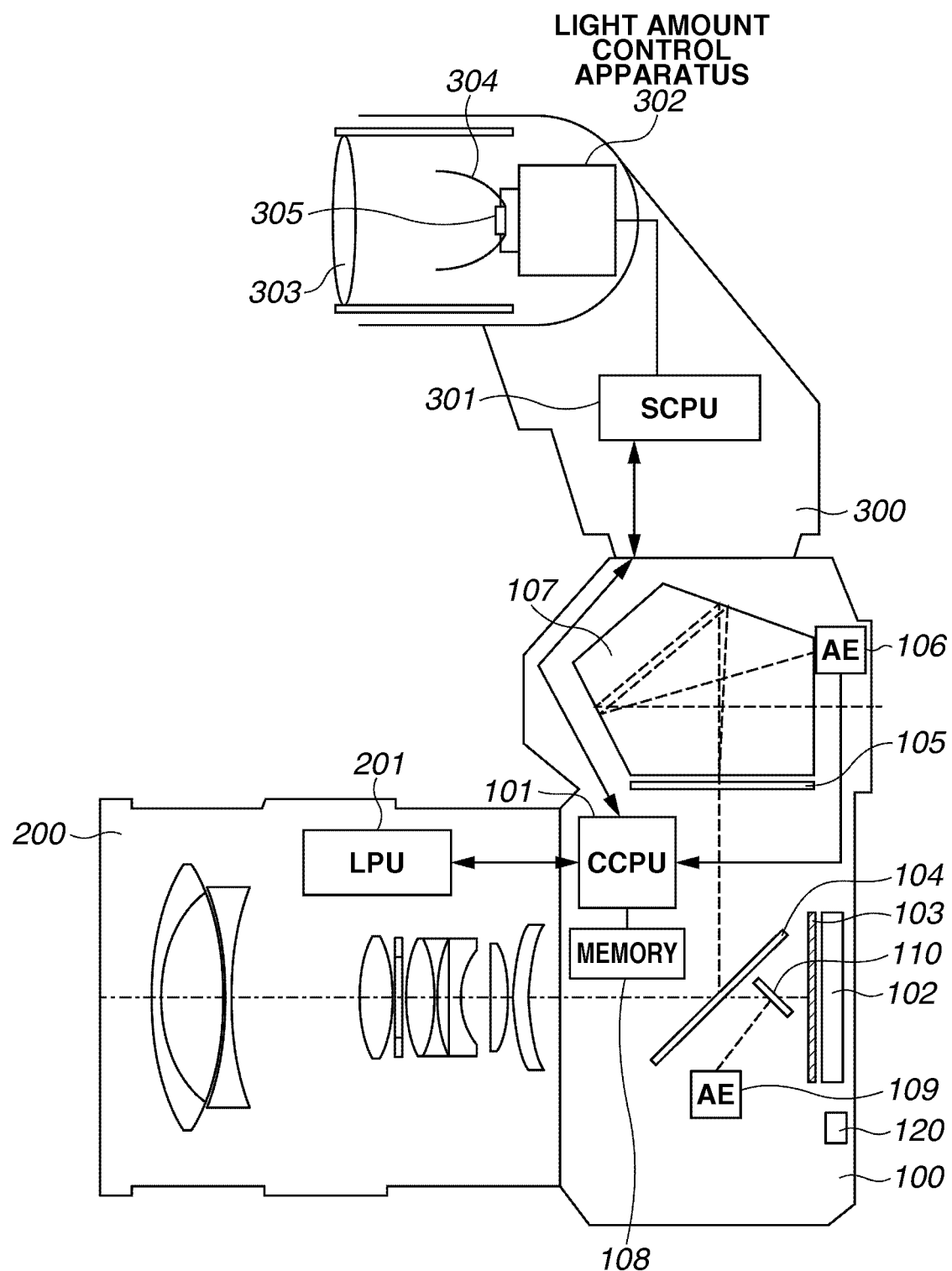
FIG. 1 illustrates a configuration of a camera system according to an exemplary embodiment of the present invention.

FIG. 1 illustrates a configuration of a camera system according to an exemplary embodiment of the present invention. This camera system includes a camera body 100 that is an imaging apparatus, a lens unit 200, and a flash apparatus 300 that is a light emitting apparatus.

The camera body 100 includes a microcomputer camera central processing unit (CCPU) (hereinafter, "camera microcomputer") 101 that controls each unit of the camera body 100. In an image sensor 102, such as a CCD or a complementary metal-oxide semiconductor (CMOS) including an infrared cut filter or a low pass filter, an image of an object is formed via a photographic lens of the lens unit 200.

A shutter 103 moves to shield the image sensor 102 from light during non-photographing and guide light entered via the photographic lens to the image sensor 102 during photographing. A half mirror 104 forms an image on a focusing plate 105 by partially reflecting light entered via the lens unit 200 during non-photographing. The focusing plate 105 is interchangeable.

A photometric circuit 106 includes a photometric sensor having a plurality of photometric areas. In the present exemplary embodiment, an image sensor such as a CCD is used as a photometric sensor to execute photometry. The photometric sensor sees an object image formed on the focusing lens 105 via a pentaprism 107 described below from an asquint position.

The pentaprism 107 guides the object image on the focusing plate 105 to the photometric sensor and an optical viewfinder (not illustrated) in the photometric circuit 106.

A memory 108 stores, as information regarding the characteristics of drop in peripheral illumination, pre-flash amount correction data to correct a pre-flash amount according to a position of a main object and photometric value correction data to correct a photometric value in which a peripheral illumination has dropped. The photometric value correction data and the pre-flash amount correction data are described below. The memory 108 also stores, as information regarding characteristics of drop in peripheral illumination of an imaging optical system that guides a light flux to the image sensor 102, a plurality of imaging correction data respectively corresponding to a plurality of lens units. The imaging correction data is correction data relating to a drop in peripheral illumination of the imaging optical system, which is different from correction data relating to a drop in peripheral illumination of the photometric optical system. The photometric value correction data, the pre-flash emission amount correction data, and the imaging correction data may not be stored independently of one another. Any one of the correction data and a conversion coefficient for converting the correction data into another correction data can be stored.

A focus detection circuit 109 includes a focus detection sensor having a plurality of focus detection areas.

The camera body 100 includes an operation unit 120 that includes a power switch and a shutter button. A switch SW 1 is turned ON when the shutter button is half-pressed to start a photographing preparation operation. A switch SW 2 is turned ON when the shutter button is fully pressed to start a photographing operation.

Operating the operation unit 120 enables setting as to which area in a photographing screen is focused (which area the focus is on). A user can operate the operation unit 120 to set focus on the selected area. The camera microcomputer 101 selects an area on which the focus based on the operation to the operation unit 120. When the user does not operate the operation unit 120 to set any arbitrary area, the camera microcomputer 101 selects an area on which the focus is automatically set by a predetermined algorithm. In the present exemplary embodiment, a plurality of areas is determined beforehand as candidates of areas on which the focus is set. A configuration of manually or automatically selecting a specific area from the candidates is described below.

Hereinafter, a frame indicating an area that becomes a candidate of an area to set focus on is referred to as an AF frame, and an area in which the focus is set is selected by choosing a specific AF frame from the AF frames. A plurality of AF frames corresponds to the plurality of focus detection areas of the focus detection sensor respectively. In the present exemplary embodiment, as illustrated in FIGS. 5A to 5E, fifteen AF frames are arranged in the photographing screen.

Operating the operation unit 120 enables selection of an arbitrary photometric mode from a plurality of photometric modes and an arbitrary photographic mode from a plurality of photographic modes.

Next, a configuration of the flash apparatus 300 is described. A microcomputer flash CPU (SCPU) (hereinafter, "flash microcomputer") 301 controls an operation of each unit of the flash apparatus 300.

A light amount control apparatus 302 includes a booster circuit that boosts a battery voltage to light a light source 305 described below, and a current control circuit that controls a start/stop of light emission. A zoom optical system 303 that changes an irradiation angle of the flash apparatus 300 includes a panel such as a Fresnel lens. A reflector 304 is disposed to condense a light flux emitted from the light source 305 that uses a xenon tube or a white light-emitting diode (LED) to irradiate the object with it.

Further, the lens unit 200 includes a microcomputer lens processing unit (LPU) (hereinafter, "lens microcomputer") 201. The lens microcomputer 201 drives, based on information transmitted from the camera microcomputer 101, the photographic lens to adjust focus. The lens unit 200 stores lens identification information to identify a type of a lens in a memory (not illustrated).

Figure 2:
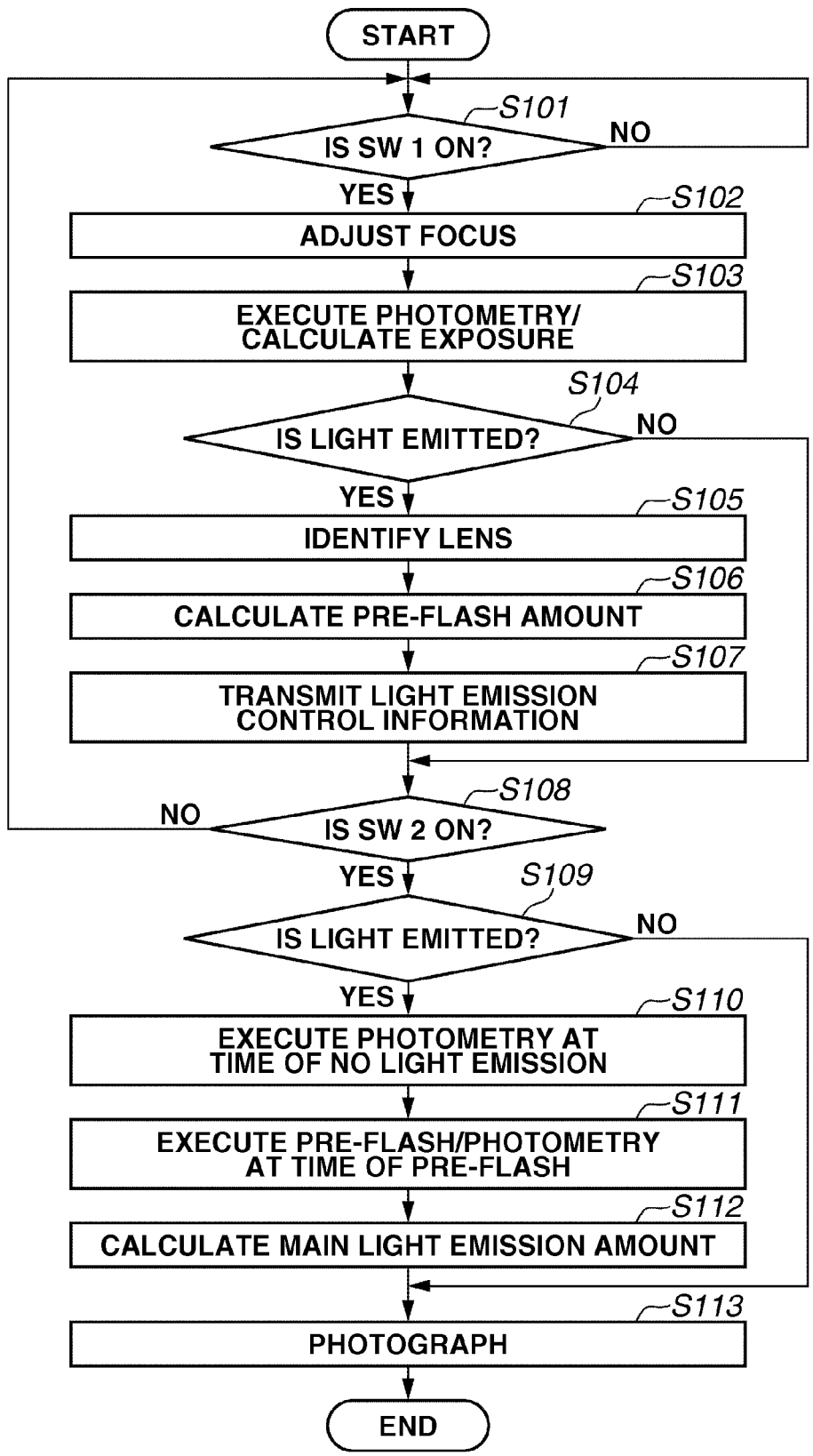
FIG. 2 is a flowchart illustrating various operations of the camera system when photographing is carried out.

Next, various operations of the camera system when flash photography is executed are described referring to a flowchart of FIG. 2.

After the power switch (not illustrated) is turned ON to activate the camera, in step S101, the camera microcomputer 101 determines whether the shutter button has been half-pressed to turn the switch SW 1 ON. If ON (YES in step S101), the processing proceeds to step S102.

In step S102, the focus detection circuit 109 executes a focus detection operation, and the camera microcomputer 101 transmits information based on a detection result to the lens microcomputer 201. The lens microcomputer 201 drives the photographic lens based on the received information to adjust focus.

In step S103, the photometric circuit 106 executes photometry of an object to acquire photometric values. The camera microcomputer 101 corrects the acquired photometric value of each photometric area by the photometric value correction data stored in the memory 108, and executes weight calculation determined based on a photometric mode or a photographic mode for each corrected photometric value to determine a final photometric value. The camera microcomputer 101 calculates an exposure control value such as exposure time and a diaphragm value during photographing based on the determined final photometric value.

The photometric value correction data, which is used to compensate for an amount of decrease in illumination of the photometric value acquired by the photometric sensor for a photometric area where a drop in peripheral illumination has occurred, is stored as a plurality of photometric value correction tables corresponding to characteristics of drop in peripheral illumination for each lens respectively. For example, for a photometric area of the surrounding part corresponding to a left lower AF frame, in a lens A illustrated in FIG. 3A, a correction value to increase the acquired photometric value by 2.2 levels is set, while in a lens B illustrated in FIG. 3B, a correction value to increase the acquired photometric value by 3.8 levels is set.

In step S104, in a mode of causing the flash apparatus 300 to automatically emit light, the camera microcomputer 101 determines whether light emission of the flash apparatus 300 is necessary based on the photometric value acquired in step S103. If the flash apparatus 300 emits light (YES in step S104), the processing proceeds to step S105. If not (NO in step S104), the processing proceeds to step S108. In a mode of forcibly causing the flash apparatus 300 to emit light or in a mode of not emitting light, the processing proceeds to a next step according to a set mode.

Figure 3A:
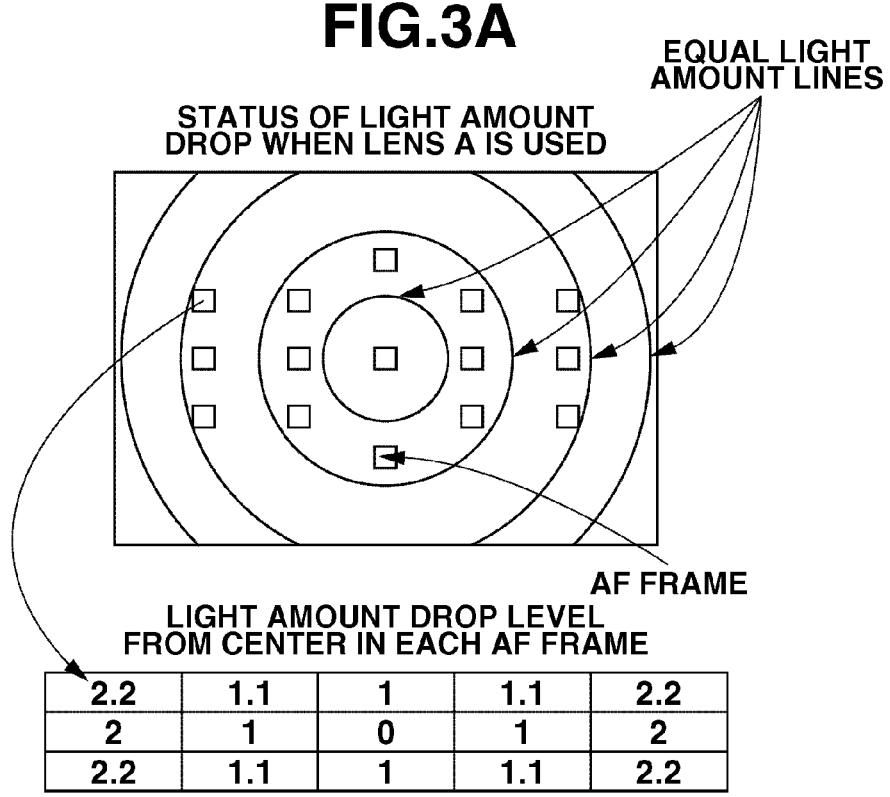
FIGS. 3A and 3B illustrate statuses of drop in peripheral illumination by a photometric optical system.
Figure 3B:
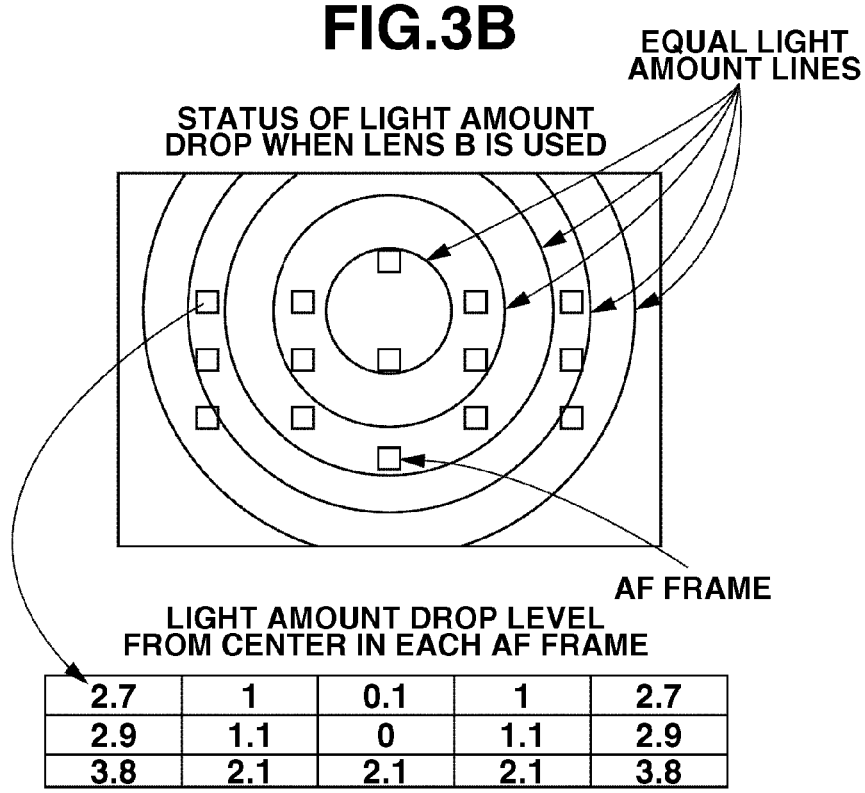

In step S105, the camera microcomputer 101 receives lens identification information from the lens microcomputer 201. A change in drop in peripheral illumination by the photometric optical system based on a lens type is described with reference to FIGS. 3A and 3B. FIGS. 3A and 3B illustrate AF frames superimposed on statuses of drop in peripheral illumination in the photographic screen. FIGS. 3A and 3B also illustrate light amount drop levels of areas corresponding to the AF frames with a light amount of the center of the photographic screen set as a reference. As a numerical value of levels is larger, a degree of a light amount drop is larger. In other words, a reduction rate of a light amount is larger in an area of a larger numerical value.

As illustrated in FIGS. 3A and 3B, the degree of a drop in peripheral illumination of the photometric optical system greatly changes depending on lens types. In comparison between the lens A and the lens B, the degree of a surrounding light amount drop is larger in the lens B than in the lens A. In the lens B, the degree of a drop in peripheral illumination is larger in a lower area from the center than in an upper area from the center.

To deal with such characteristics of drop in peripheral illumination for each lens, the memory 108 stores pre-flash amount correction data to correct a pre-flash amount according to a position of a main object as a plurality of pre-flash amount correction tables respectively corresponding to characteristics of drop in peripheral illumination for each lens.

Figure 4:
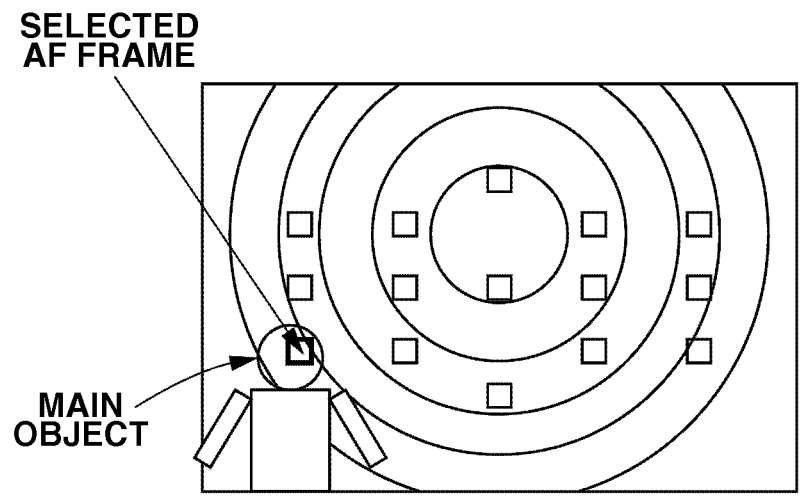
FIG. 4 illustrates a correction value of a pre-flash emission amount according to a position of an object.
Figure 4:
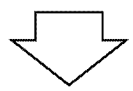

The pre-flash amount correction table is, as illustrated in FIG. 4, a table in which a correction value approximately equal to the degree of a light amount drop for each area corresponding to each AF frame is set with respect to a reference light emission amount set according to the center. For example, a correction value of an area corresponding to an AF frame of the center is set to 0, and a correction value of an area corresponding to a left lower AF frame is set to 4.

Specifically, numerical values illustrated in FIG. 4 indicate differences of pre-flash amounts from the center of the photographing screen, and correction values are set to make pre-flash amounts larger from the center of the photographing screen to the surrounding part of the photographing screen. Correcting a pre-flash amount by using a correction amount corresponding to an area where the main object is present in the pre-flash amount correction table enables setting of an appropriate pre-flash amount for the main object.

In step S106, the camera microcomputer 101 calculates a pre-flash amount by using, among the plurality of pre-flash amount correction tables stored in the memory 108, a pre-flash amount correction table corresponding to the lens identification information acquired in step S104.

In this case, since the area corresponding to the AF frame selected to adjust the focus in step S102 is considered to be an area where the main object is present, the camera microcomputer 101 calculates the pre-flash amount by using a correction value of the area corresponding to the AF frame selected in the pre-flash amount correction table. For example, if the main object is present in a position illustrated in FIG. 4 and the left lower AF frame is selected, a light amount drops by 3.8 levels in an area corresponding to the selected AF frame, namely, a target area for calculating a pre-flash amount, from the center. Thus, a photometric value is enlarged during pre-flash in the area corresponding to the left lower AF frame by correcting the pre-flash amount by 4 levels from the reference light emission amount based on the pre-flash amount correction table. As a result, the photometric value can be within the dynamic range of the photometric sensor.

In the case of automatically selecting an AF frame by a predetermined algorithm, if an AF frame to be selected is changed according to movement of the main object, the camera microcomputer 101 can recalculate a pre-flash amount for each change of an AF frame to be selected. Similarly, if an AF frame to be selected is changed by a user's operation, the camera microcomputer 101 can recalculate a pre-flash amount.

If no pre-flash is carried out, such as a mode of executing main light emission based on a light emission amount set by the user, step S106 can be omitted.

In step S107, the camera microcomputer 101 transmits light emission control information on the pre-flash amount calculated in step S106 to the flash microcomputer 301.

In step S108, the camera microcomputer 101 determines whether the switch SW2 has been turned ON by fully pressing the shutter button. If ON (YES in step S108), the processing proceeds to step S109. If OFF (NO in step S108), the processing returns to step S101.

In step S109, the camera microcomputer 101 determines the necessity of light emission of the flash apparatus 300 as in the case of step S104. If the flash apparatus emits light (YES in step S109), the processing proceeds to step S110. If not (NO in step S109), the processing proceeds to step S113.

In step S110, before the flash apparatus 300 executes pre-flash, the photometric circuit 106 executes photometry of the object in a non-light emitting state of the flash apparatus 300 to acquire a photometric value of non-light emission time.

In step S111, the flash apparatus 300 executes pre-flash based on the pre-flash amount calculated in step S106. The photometric circuit 106 carries out photometry for the object in a pre-flash state to acquire a photometric value of pre-flash time.

In step S112, the camera microcomputer 101 calculates a main light emission amount of the flash apparatus 300 based on the photometric value of the non-light emission time acquired in step S110 and the photometric value of the pre-flash time acquired in step S111.

An example of a method for calculating a main light emission amount illustrated in FIG. 4 is described below.

When the main object is present in the position illustrated in FIG. 4 and the left lower AF frame is selected, a pre-flash amount A is calculated by $A=A0\times24$ based on the pre-flash amount correction table, where A0 is a reference light emission amount.

A pre-flash component photometric value B is then calculated by subtracting a non-light emission time photometric value from a pre-flash time photometric value acquired by correcting a light emission amount to execute pre-flash. A pre-flash component photometric value C assumed when pre-flash is executed at a reference light emission amount is calculated by $C=B\times2-4$ based on the pre-flash component photometric value B.

The pre-flash component photometric value C is then corrected based on the photometric value correction table. For example, a photometric value D after drop in peripheral illumination correction of a photometric area corresponding to the left lower AF frame is calculated by $D=C\times23.8$.

A drop in peripheral illumination is corrected for a photometric value of each photometric area as described above, and a weight determined based on the photometric mode or the photographing mode is calculated for each photometric value D after the correction, thereby acquiring a final photometric value E. A main light emission amount G to achieve a target photometric value F is then calculated by $G=A0\times F/E$.

The above-described calculation method is only an example. Any method for calculating a main light emission amount based on a pre-flash time photometric value is applicable. For example, considering that a non-light emission time photometric value is smaller to be ignored than the pre-flash time photometric value, a main light emission amount can be calculated by pre-flash n component photometric value B=pre-flash photometric value.

In step S113, the camera microcomputer 101 performs photographing. To cause the flash apparatus 300 to emit light, the camera microcomputer 101 causes the flash apparatus 300 to emit light by the main light emission amount calculated in step S112 accompanying the photographing. In this case, the camera microcomputer 101 corrects a drop in peripheral illumination for the image data acquired by imaging by using the imaging correction data stored in the memory 108.

Thus, even when there is a main object in an area where a drop in peripheral illumination, correcting a pre-flash amount according to a position of the main object to compensate for the drop in peripheral illumination enables a photometric value of the main object at the time of pre-flash to be within the dynamic range of the photometric sensor. As a result, the photometric value of the main object at the time of pre-flash can be accurately acquired, and an appropriate main light emission amount can be calculated for the main object.

In the present exemplary embodiment, the pre-flash amount correction tables correspond to the characteristics of drop in peripheral illumination for each lens. However, the drop in peripheral illumination of the photometric optical system changes depending on a type of a focusing plate, and hence pre-flash amount correction tables taking types of focusing plates into consideration can be used. For example, as illustrated in FIGS. 5A to 5E, characteristics of decrease in peripheral illumination are different between when a standard focusing plate is used and when an interchangeable focusing plate A is used.

Thus, pre-flash amount correction tables combining types of lenses and types of focusing lenses are stored in the memory 108. To calculate a pre-flash amount, an appropriate pre-flash amount correction table can be selected based on a type of a lens and a type of a focusing plate. For a type of a focusing plate, a mechanism for automatically identifying a type of an attached focusing plate can be provided, or the user can input the type of the attached focusing plate by operating the operation unit 120. Types of lenses and types of focusing plates that can be identified are not limited to numbers illustrated in FIGS. 5A to 5E.

AF frames are not limited to a number illustrated in FIGS. 5A to 5E, nor set in predetermined positions. For example, an AF frame can be set in a position of the object area detected by an object detection unit (not illustrated) or an arbitrary position designated by the user, and the AF frame can move following movement of the object.

In such a configuration, setting a correction value of a pre-flash amount corresponding to an AF frame as in the case of the present exemplary embodiment is not effective. Thus, degrees of drop in peripheral illumination are illustrated in a map, and a correction amount of a pre-flash amount can be determined according to which position an AF frame is present. Alternatively, as illustrated in FIGS. 3A and 3B, the photographing screen is divided into a plurality of areas based on degrees of drop in peripheral illumination, and a correction amount of a pre-flash amount is set for each divided area. A correction amount of a pre-flash amount can then be determined according to which area an AF frame is present.

To identify a type of a lens, the user can input the type of a lens by operating the operation unit 120.

When a type of a lens cannot be identified, such as when lens identification information cannot be acquired, a pre-flash amount cannot be corrected. Thus, when the main object is present in an area where a degree of a surrounding light amount drop is large, a warning can be issued on a display unit (not illustrated).

Matching between an area where focus is set by focus adjustment and a target area for calculating a pre-flash amount is unnecessary and each area can be independently selected.

When the main object is present in an area where a degree of a drop in peripheral illumination is large, correcting a pre-flash amount to be larger may cause photometric values of the other areas to exceed the dynamic range of the photometric sensor. Thus, the pre-flash amount is corrected when a photometric mode or a photographic mode of setting a weight of a photometric area corresponding to a selected AF frame relatively larger than those of the other photometric areas is set. In particular, the pre-flash amount is corrected when a photometric mode or a photographing mode of using only photometric values of certain areas including the photometric area corresponding to the selected AF frame is set.

According to the present invention, a light receiving amount of the photometric sensor during a photometry period for acquiring a photometric value used for determining a main light emission amount based on a position of an area selected in the photographing screen is controlled. Thus, a parameter different from that for the pre-flash amount can be controlled. For example, in a configuration where pre-flash can be continuously carried out, the camera microcomputer 101 can control a length of a photometry period in place of the pre-flash amount.

In place of the configuration where a detachable flash apparatus is attached to the camera body to be used as a light emitting apparatus, a configuration where a light emitting unit integrated with the camera body can be employed. In place of the configuration where the detachable lens unit is attached to the camera body to be used, a configuration where the lens unit is integrated with the camera body can be employed. Furthermore, various changes and modifications can be made of the present invention within the spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-087631 filed Apr. 11, 2011, which is hereby incorporated by reference herein in its entirety.

What is claimed is:

1. An imaging apparatus configured to perform photographing with a light emitting unit executing main light emission, the imaging apparatus comprising:
   photometric unit configured to execute photometry;
   a selection unit configured to select an area in a photographing screen; and
   a control unit configured
      to determine a main light emission amount of the light emitting unit based on a photometric value acquired by photometry executed by the photometric unit with pre-flash emission of the light emitting unit and
      to, based on a position of the area selected by the selection unit, control a light receiving amount of the photometric unit during a photometry period for acquiring the photometric value used for determining the main light emission amount.

2. The imaging apparatus according to claim 1, wherein the control unit determines the main light emission amount of the light emitting unit by setting a weight for a photometric value of the area selected by the selection unit larger than those of areas not selected by the selection unit.

3. The imaging apparatus according to claim 1, wherein the control unit controls the light receiving amount of the photometric unit during the photometry period by controlling a pre-flash emission amount of the light emitting unit based on the position of the area selected by the selection unit.

4. The imaging apparatus according to claim 1, wherein the control unit controls the light receiving amount of the photometric unit during the photometry period by controlling a length of the photometry period based on the position of the area selected by the selection unit.

5. The imaging apparatus according to claim 1, further comprising a focus adjustment unit configured to adjust focus,
wherein the selection unit selects an area to focus by the focus adjustment unit.

6. The imaging apparatus according to claim 1, further comprising an operation unit configured to instruct an area to be selected by the selection unit,
wherein the selection unit selects an area in the photographing screen based on an operation to the operation unit.

7. The imaging apparatus according to claim 1, wherein the control unit sets the light receiving amount of the photometric unit larger during the photometry period when the selected area is a surrounding part of the photographing screen than when the selected area is a center of the photographing screen.

8. The imaging apparatus according to claim 1, wherein the control unit controls the light receiving amount of the photometric unit during the photometry period to compensate for a light amount drop in the selected area with respect to a center of the photographing screen.

9. The imaging apparatus according to claim 1, wherein a lens unit is detachably attached to the imaging apparatus, and
wherein the control unit controls the light receiving amount of the photometric unit during the photometry period based on a type of attached lens unit.

10. The imaging apparatus according to claim 9, further comprising a storage unit configured to store information regarding a plurality of characteristics of drop in peripheral illumination corresponding to the detachable lens unit,
wherein the control unit controls the light receiving amount of the photometric unit during the photometry period based on the information regarding the characteristics of drop in peripheral illumination stored in the storage unit.

11. The imaging apparatus according to claim 10, further comprising an imaging unit configured to acquire image data by capturing an image of an object,
wherein the control unit corrects the image data based on the information regarding the characteristics of drop in peripheral illumination stored in the storage unit.

12. The imaging apparatus according to claim 1, further comprising an interchangeable focusing plate, and
wherein the control unit controls the light receiving amount of the photometric unit during the photometry period based on a type of focusing plate.

13. A camera system including a light emitting apparatus and an imaging apparatus configured to perform photographing with the light emitting apparatus executing main light emission, the camera system comprising:
a photometric unit configured to execute photometry;
a selection unit configured to select an area in a photographing screen; and
a control unit configured to determine a main light emission amount of the light emitting apparatus based on a photometric value acquired by photometry executed by the photometric unit with pre-flash emission of the light emitting unit, and to, based on a position of the area selected by the selection unit, control a light receiving amount of the photometric unit during a photometry period for acquiring the photometric value used for determining the main light emission amount.

* * * * *